US011165997B2

United States Patent
Ishii

(10) Patent No.: US 11,165,997 B2
(45) Date of Patent: Nov. 2, 2021

(54) IMAGE PROJECTION APPARATUS THAT SHIFTS POSITION OF PROJECTED IMAGE, CONTROL METHOD FOR IMAGE PROJECTION APPARATUS, AND STORAGE MEDIUM

(71) Applicant: CANON KABUSHIKI KAISHA, Tokyo (JP)

(72) Inventor: Atsushi Ishii, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/536,757

(22) Filed: Aug. 9, 2019

(65) Prior Publication Data
US 2020/0107000 A1 Apr. 2, 2020

(30) Foreign Application Priority Data
Aug. 22, 2018 (JP) .............................. JP2018-155221

(51) Int. Cl.
*H04N 9/31* (2006.01)
*G09G 3/36* (2006.01)

(52) U.S. Cl.
CPC ............. *H04N 9/3185* (2013.01); *G09G 3/36* (2013.01)

(58) Field of Classification Search
CPC .. H04N 9/3188; H04N 9/3147; H04N 9/3182; H04N 9/3185; G06T 7/60; G03B 21/005; G09G 3/36
See application file for complete search history.

(56) References Cited

U.S. PATENT DOCUMENTS

| 9,792,695 | B2 * | 10/2017 | Sasaki | G06K 9/4671 |
|---|---|---|---|---|
| 2003/0095723 | A1 * | 5/2003 | Ishizaka | G06T 3/4007 382/298 |
| 2006/0158623 | A1 * | 7/2006 | Kobayashi | G03B 21/005 353/122 |
| 2008/0174625 | A1 * | 7/2008 | Choi | B41J 2/2139 347/16 |
| 2009/0027571 | A1 * | 1/2009 | Amano | H04N 9/3194 348/744 |
| 2009/0033881 | A1 * | 2/2009 | Mihara | H04N 9/3185 353/69 |
| 2009/0141255 | A1 * | 6/2009 | Yoshizawa | G03B 21/005 353/122 |
| 2011/0019166 | A1 * | 1/2011 | Ishida | G03B 21/005 353/122 |

(Continued)

FOREIGN PATENT DOCUMENTS

JP 2001215610 A 8/2001
JP 2012177846 A 9/2012
(Continued)

*Primary Examiner* — Paulos M Natnael
(74) *Attorney, Agent, or Firm* — Rossi, Kimms & McDowell LLP

(57) ABSTRACT

An image projection apparatus configured to project a first range with a predetermined image quality includes a shifting unit configured to shift a position where a projection image is projected, a determining unit configured to determine whether a target position shifted by the shifting unit is located in a second range different from the first range, and a notifying unit configured to notify a user of a predetermined notice when the target position is located in the second range.

15 Claims, 5 Drawing Sheets

(56) References Cited

U.S. PATENT DOCUMENTS

| | | | |
|---|---|---|---|
| 2014/0035907 A1* | 2/2014 | Hasegawa | H04N 13/305 345/419 |
| 2015/0347862 A1* | 12/2015 | Sasaki | G06T 7/73 382/195 |
| 2016/0044289 A1* | 2/2016 | Matsuno | G02B 13/16 348/745 |
| 2016/0219218 A1* | 7/2016 | Kinoshita | H04N 5/30 |
| 2016/0283819 A1* | 9/2016 | Sasaki | G06T 7/73 |
| 2016/0335778 A1* | 11/2016 | Smits | G01P 3/36 |
| 2016/0364626 A1* | 12/2016 | Sasaki | G06K 9/4671 |
| 2017/0059844 A1* | 3/2017 | Sato | G06T 3/4092 |
| 2017/0206661 A1* | 7/2017 | Sasaki | G06F 3/0488 |
| 2017/0244941 A1* | 8/2017 | Yagi | H04N 9/3147 |
| 2017/0366789 A1* | 12/2017 | Shimizu | H04N 5/74 |
| 2018/0167558 A1* | 6/2018 | Hirai | G09G 5/377 |
| 2018/0299759 A1* | 10/2018 | Kuboya | G03B 21/00 |
| 2019/0219905 A1* | 7/2019 | Nishikawa | G02B 13/16 |

FOREIGN PATENT DOCUMENTS

| | | | |
|---|---|---|---|
| JP | 2013037082 A | 2/2013 | |
| JP | 2019028441 A | 2/2019 | |

* cited by examiner

SHIFT RANGE SETTING

IF SHIFT RANGE SETTING IS CHANGED FROM "NORMAL" TO "EXPANDED," SHIFT IN WIDER RANGE IS AVAILABLE.

CHANGE TO "EXPANDED?"

*WARNING *IMAGE MAY DETERIORATE

YES　　NO

FIG. 3

SHIFT RANGE LIMIT

IF SHIFT RANGE SETTING IS SET TO "NORMAL," NO SHIFT AVAILABLE TO WIDER RANGE.

WIDER RANGE IS SHIFTED BY CHANGING SHIFT RANGE SETTING TO "EXPANDED" OR BY AGAIN PERFORMING SHIFT OPERATION

*WARNING* IMAGE MAY DETERIORATE

FIG. 5

IMAGE PROJECTION APPARATUS THAT SHIFTS POSITION OF PROJECTED IMAGE, CONTROL METHOD FOR IMAGE PROJECTION APPARATUS, AND STORAGE MEDIUM

BACKGROUND OF THE INVENTION

Field of the Invention

The present invention relates to an image projection apparatus having a shifting unit configured to shift a position of a projected image.

Description of the Related Art

There has conventionally been known an image projection apparatus including a shifting unit configured to shift a projection image in a direction orthogonal to an optical axis direction. This image projection apparatus generally limits a shiftable range of the shifting unit to a narrower range than a mechanical shiftable range in order to avoid the deterioration of the image quality of the projection image due to the decrease in optical performance. For example, Japanese Patent Laid-Open No. ("JP") 2012-177846 discloses an image projection apparatus that controls a shift using a lens shift mechanism so that a projection lens falls within a range of an effective image display area as a displayable area of a projection image having an evaluation value higher than a predetermined evaluation value.

The user may wish to expand a shift range rather than avoiding the degradation of the image quality. In this case, the image projection apparatus disclosed in JP 2012-177846 cannot perform the shift control outside the range of the effective image display area, and thus lacks the flexibility.

SUMMARY OF THE INVENTION

The present invention provides an image projection apparatus, a control method for the image projection apparatus, and a storage medium, each of which can notify information on an expansion of a shift range.

An image projection apparatus according to one aspect of the present invention configured to project a first range with a predetermined image quality includes a shifting unit configured to shift a position where a projection image is projected, a determining unit configured to determine whether a target position shifted by the shifting unit is located in a second range different from the first range, and a notifying unit configured to notify a user of a predetermined notice when the target position is located in the second range.

A control method for an image projection apparatus according to the present invention including a shifting unit configured to shift a position where the projection image is projected and to project a first range with a predetermined quality includes the steps of determining whether a target position shifted by the shifting unit is located in a second range different from the first range, and sending a predetermined notice to the user when the target position is located in the second range. A non-transitory computer-readable storage medium storing a program for causing a computer to execute the control method also constitute another aspect of the present invention.

Further features of the present invention will become apparent from the following description of exemplary embodiments with reference to the attached drawings.

BRIEF DESCRIPTION OF THE DRAWINGS

FIG. 3 explains an OSD image according to the first embodiment.

FIG. 5 explains an OSD image according to the second embodiment.

DESCRIPTION OF THE EMBODIMENTS

Referring now to the accompanying drawings, a description will be given of embodiments according to the present invention.

First Embodiment

Figure 1:
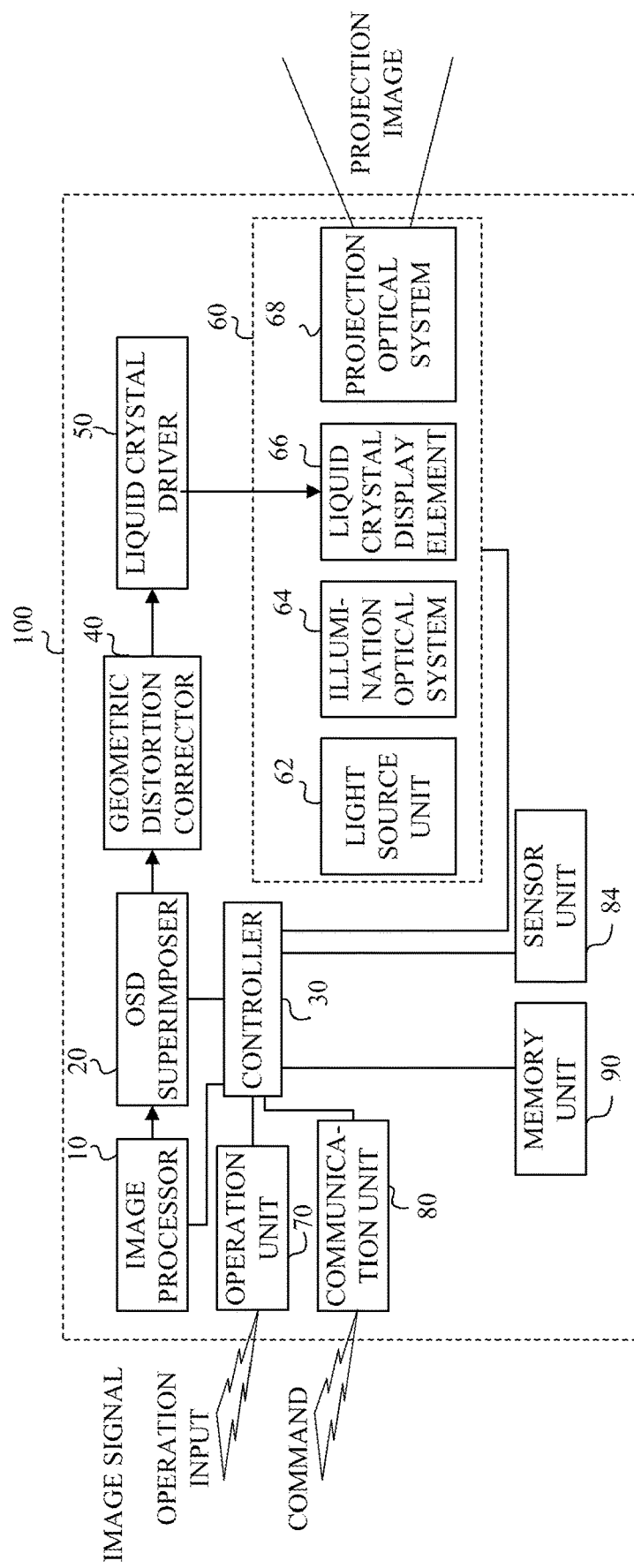
FIG. 1 is a block diagram of an image projection apparatus according to each embodiment.

Referring now to FIG. 1, a description will be given of a configuration of an image projection apparatus according to a first embodiment of the present invention. FIG. 1 is a block diagram of an image projection apparatus (liquid crystal projector) 100.

An image processor 10 receives an image signal output from an external apparatus via a composite terminal, an HDMI (registered trademark) terminal, a DVI terminal, a DisplayPort terminal, and the like. The image processor 10 further includes apparatus, such as an AD converter and a receiver IC, necessary to receive an image signal input through the terminals. The image processor 10 can also receive, as an image signal, an image file such as JPEG, BMP, and PNG, and a streaming motion image through a USB terminal or a LAN terminal. The image processor 10 also performs image processing for an image based on an image signal.

In other words, for example, the image processor 10 performs arbitrary image processing among the brightness adjustment, the contrast adjustment, the color conversion by the LUT, the resolution conversion into an arbitrary resolution, the sharpening processing, the smoothing processing, the frame rate conversion, the IP conversion, and the like to generate an image signal.

The OSD superimposer (operation display unit) 20 superimposes an OSD (On Screen Display) image on the image signal output from the image processor 10. The OSD image can be generated not only based on the image data such as a Bitmap prepared in advance but also based on a drawing instruction of a straight line, a rectangle, or a pixel unit.

A geometric distortion corrector 40 performs deformation processing (conversion processing) for the image signal output from the OSD superimposer 20 so as to correct a geometric distortion generated in the projection image. The appropriate conversion processing in the geometric distortion corrector 40 can suppress a distortion of a projection image caused by a tilt projection or the like.

A liquid crystal driver 50 is connected to the geometric distortion corrector 40, converts the image signal corrected by the geometric distortion corrector 40 into a liquid crystal drive signal (drive signal), and drives a liquid crystal display element (image display element, light modulation element) 66 of the optical system 60. This embodiment may use a light modulation element, such as a DMD (Digital Mirror Device), instead of the liquid crystal display element 66. The liquid crystal driver 50 can perform the luminance adjustment in pixel unit and adjusts a position at which an image is formed on the liquid crystal display element 66. The liquid crystal driver 50 can also perform an edge blend correction (gradation correction of each of the blended area and the out-of-blended area) in order to make the overlapping portion inconspicuous in the multi-projection.

The optical system 60 includes a light source unit 62, an illumination optical system 64, a liquid crystal display element 66, and a projection optical system 68. The light emitted from the light source unit 62 passes through the illumination optical system 64, is modulated by the liquid crystal display element 66, and is projected on a screen (projection surface) as a projection image through the projection optical system (projection lens) 68. The liquid crystal display element 66 is connected to the liquid crystal driver 50, and modulates an incident light beam (light emitted from the light source unit 62 and transmitted through the illumination optical system 64) based on a liquid crystal drive signal from the liquid crystal driver 50. In this embodiment, the liquid crystal display element 66 serves as a notifying unit configured to notify the user of a predetermined notice when the target position (the shift target position) based on the user's operation input is located in the second range as described later.

The projection optical system 68 adjusts optical zooming (enlargement or reduction of the projection image), an optical shift (movement of the position of the projection image on the projection surface), and focusing by moving the lens or lens unit by a motor. The optical shift is to move part of lenses or part of lens units of the projection optical system 68 in a direction perpendicular to the optical axis. However, the present invention is not limited to this embodiment, and the entire projection optical system (projection lens) 68 may be moved in the direction perpendicular to the optical axis for the optical shift. The projection optical system 68 is interchangeably attached to the main body of the image projection apparatus 100 by the user, and can select a projection lens having a different image quality, a different angle of view, a different optical shift range, etc. according to an use environment. In the projection optical system 68, a shiftable range (a movable range of the projection image on the projection surface) is predetermined for each lens. In this embodiment, the projection optical system 68 constitutes a shifting unit configured to optically shift the position where the projection image is projected. However, the present invention is not limited to this embodiment, and the shifting unit may be configured by a liquid crystal driver (digital shifting unit) 50 that electronically shifts the position where the projection image is projected. In this embodiment, the range shiftable by the shifting unit includes two types of ranges, or a "normal" range (first range) for securing the image quality (predetermined image quality) of a predetermined level or higher, and an "extended" range (second range) in which the image quality may deteriorate or lack. The user can selectively switch whether to set the shiftable range only to the first range or both the first range and the second range. The image quality of the predetermined level or higher contains, for example, a projection (displayable) range (area) of a projection image having an evaluation value higher than a predetermined evaluation value. The predetermined evaluation value is, for example, a value obtained by evaluating a deterioration, chip etc. of the image quality, such as a (peripheral) light amount drop, a chromatic aberration, a distortion, and a curvature of field. The image quality of the projection image is high when the evaluated value is high, and the image quality of the projection image is low when the evaluated value is low.

An operation unit 70 includes a button for the user to input an operation, and an infrared light receiver configured to receive an infrared ray from a remote controller, and converts an operation input from the user into an electric signal and outputs it. A type of operation includes a determination of an instruction, a cancellation, a menu display for a variety of settings, a direction instruction of up, down, left, and right, a power control, and the like.

A communication unit 80 has a wired and wireless communication function, receives a command from an external apparatus, and transmits a command from the image projection apparatus 100 to the external apparatus. When the communication unit 80 receives the command, the control unit (CPU) 30 controls, for example, the image processor 10, the geometric distortion corrector 40, or the optical system 60, and performs processing corresponding to an operation input to the operation unit 70.

A sensor unit 84 includes a camera and an orientation sensor, captures an image of the projection surface, and acquires the orientation state of the image projection apparatus 100. The controller 30 uses an output signal from the sensor unit 84 as information for checking the projection image or for performing a geometric deformation.

A memory unit 90 stores various information, such as a variety of set values input by the user, information in shipping of the image projection apparatus 100, use time, and a log. The memory unit 90 also stores setting information and the like regarding a drive state of the lens, edge blending, a geometric distortion correction, and a limitation of the shift range (shiftable range).

The controller 30 is connected to many unillustrated devices including a temperature sensor and a fan in addition to the image processor 10, the OSD superimposer 20, the geometric distortion corrector 40, the liquid crystal driver 50, the operation unit 70, the communication unit 80, the sensor unit 84, the memory unit 90, and the optical system 60. The controller 30 includes a microcomputer (processor) that controls the power supply and the state of each component in the image projection apparatus 100. When the controller 30 detects the abnormality in the internal state of the image projection apparatus 100, the controller 30 automatically performs processing such as powering off, stopping the light source unit 62, enhancing cooling, and warning the user. The controller 30 accepts an operation input of the user from operation unit 70, and performs a control or the like according to the operation input. The controller 30 performs processing and the like according to the command received from the communication unit 80. For example, the controller 30 controls the OSD superimposer 20 to display a menu screen. The controller 30 controls the image processor 10, the geometric distortion corrector 40, or the projection optical system 68, controls the state or function of each component, acquires the state, and the like. In this embodiment, the controller 30 serves as a determining unit (detector) configured to determine (detect) whether or not the target position (shift target position) shiftable by the shifting unit is located in a second range outside a first range (range different from a range that can be projected with a predetermined image quality).

Figure 2:
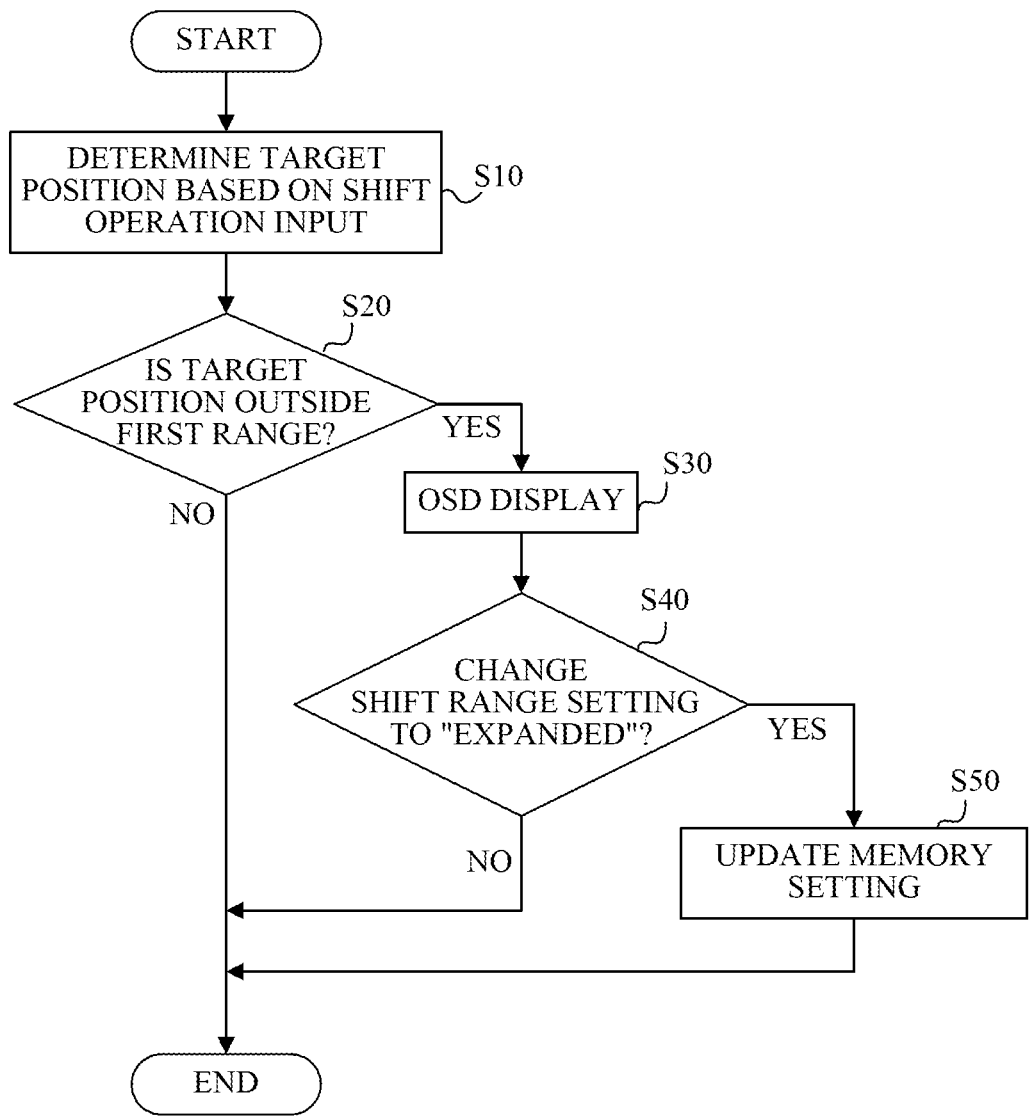
FIG. 2 is a flowchart showing a control method for the image projection apparatus according to a first embodiment.

Referring now to FIG. 2, a description will be given of an operation of the shift range control of the controller 30 according to this embodiment (control method of the image projection apparatus 100). FIG. 2 is a flowchart showing a control method of the image projection apparatus 100 according to this embodiment. The controller 30 executes each step in FIG. 2 in accordance with a computer program (control program).

Initially, in the step S10, the user performs a shift operation (shift operation input) via the operation unit (instructing unit) 70. The shift operation input can be performed via the operation unit 70 such as a remote controller or the operation unit of an external apparatus such as a personal computer. The controller 30 determines the target position (the target position of the projection image on the projection surface, the shift position of the lens unit, and the shift position of the digital shift unit) according to the shift operation input (instruction signal) of the user obtained through the operation unit 70.

Next, in the step S20, the controller 30 determines whether or not the target position (shift position) determined in the step S10 is located outside the "normal" range (first range). If the target position is located in the first range, this flow ends. On the other hand, if the target position is located outside the first range (if the target position is located in the second range), the flow proceeds to the step S30.

In the step S30, the controller 30 performs the OSD display using the OSD superimposer 20 (superimposes the OSD image on the projection image). Referring now to FIG. 3, a description will be given of the OSD image according to this embodiment. FIG. 3 is an explanatory view of the OSD image. As illustrated in FIG. 3, this embodiment describes that the shift range is expanded by changing the shift range setting from "normal" to "expanded" and displays the OSD image regarding an inquiry of whether or not the shift range setting is changed to "expanded." Then, in changing to "expanded," a warning may be simultaneously displayed that the image quality may deteriorate. For example, the user can select "Yes" or "No" using the operation unit 70, such as a remote controller, for the display of the image illustrated in FIG. 3.

Then, in the step S40, the controller 30 determines whether or not the shift range setting has been changed to "expanded," or whether both the first range and the second range have been set to the shiftable range. In this embodiment, the controller 30 receives an operation input of the user for the OSD image displayed in the step S30 via the operation unit 70, and performs processing in accordance with the received operation input. When the user selects "No" in FIG. 3 (when the controller 30 receives an operation input indicating that "No" is selected via the operation unit 70), this flow ends. On the other hand, when the user selects "Yes" in FIG. 3 (when the controller 30 receives an operation input indicating that "Yes" is selected via the operation unit 70), the flow proceeds to the step S50.

In the step S50, the controller 30 changes (updates) the shift range setting (or shiftable range) stored in memory unit 90 from the "normal" range (only the first range) to the "expanded" range (both the first range and the second range), and ends this flow. The actual shift control is performed based on the current control state and the shift range setting after the flow illustrated in FIG. 2 ends.

When the target position by the shifting unit through the shift operation exceeds a limit of the shiftable range (when the shift target position is located outside the first range), this embodiment describes the shift range setting (shiftable range) and displays the OSD regarding the change. Thereby, the setting according to the application of the image projection apparatus 100 can be provided to the user, and the shift range setting can be easily changed.

Second Embodiment

Next follows a description of an image projection apparatus according to a second embodiment of the present invention. In this embodiment, a basic configuration of the image projection apparatus (liquid crystal projector) is the same as that of the image projection apparatus 100 according to the first embodiment described with reference to FIG. 1.

Figure 4:
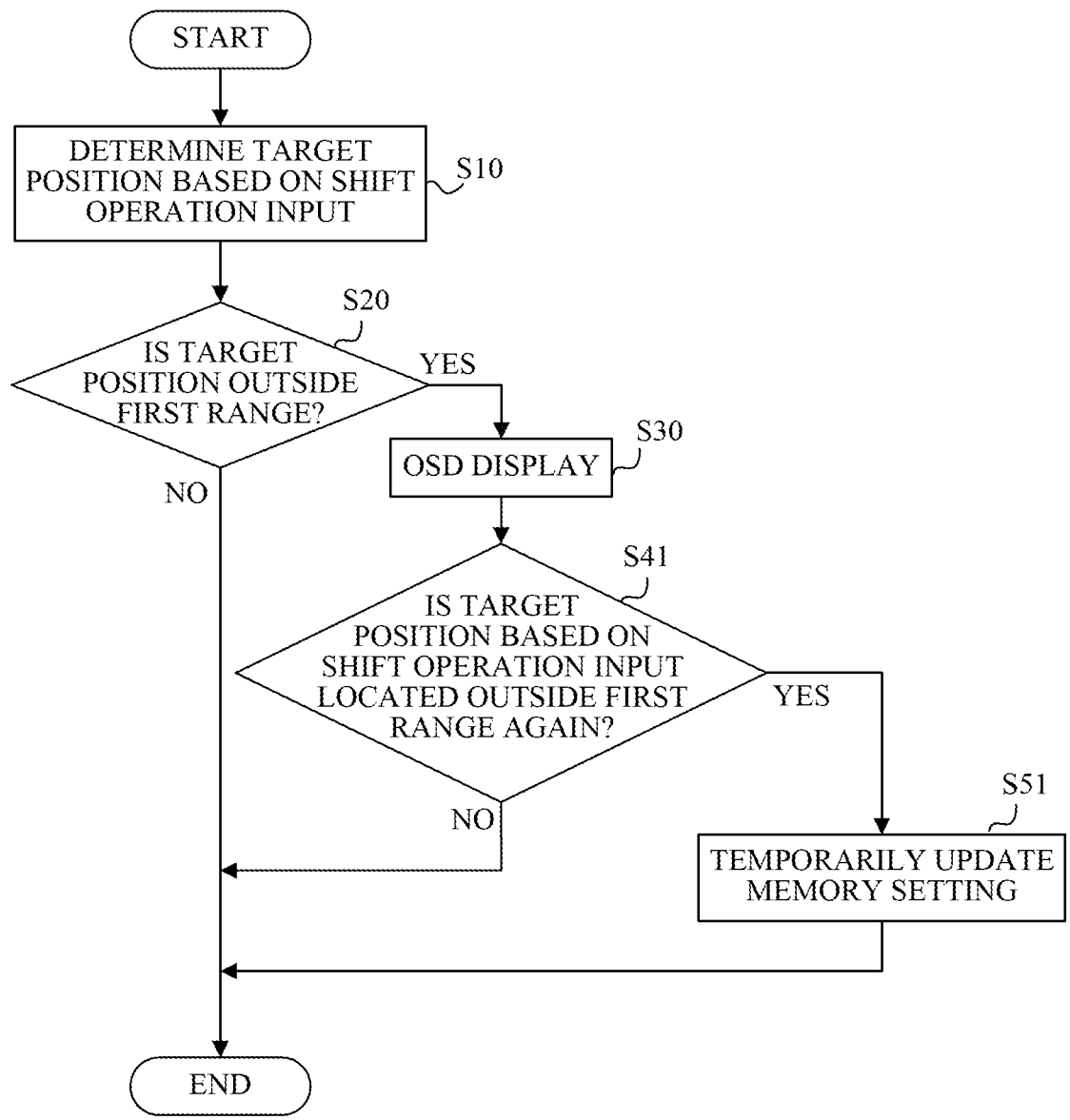
FIG. 4 is a flowchart showing a control method for an image projection apparatus according to a second embodiment.

Referring now to FIG. 4, a description will be given of an operation of a shift range control of the controller 30 according to this embodiment (control method of the image projection apparatus 100). FIG. 4 is a flowchart showing a control method of the image projection apparatus 100 according to this embodiment. The controller 30 executes each step in FIG. 4 in accordance with a computer program (control program). The control method according to this embodiment illustrated in FIG. 4 is different from the control method described with reference to FIG. 2 according to the first embodiment in the contents of the OSD image displayed in the step S30, and the steps S41 and S51 instead of steps S40 and S50, respectively. Since the other steps in FIG. 4 are the same as those in FIG. 2, and a description thereof will be omitted.

In the step S30, the controller 30 performs the OSD display using the OSD superimposer 20 (superimposes the OSD image on the projection image). Referring now to FIG. 5, a description will be given of the OSD image according to this embodiment. FIG. 5 is an explanatory view of the OSD image. As illustrated in FIG. 5, in this embodiment, unlike the OSD display in the first embodiment, the OSD is displayed on the screen indicating that the target position (shift target position) based on the shift operation input by the user is the shift range limit (located outside of the shiftable range). The user can shift to a wider range (second range) by changing the shift range setting to "expanded" or by performing the shift operation again according to the OSD display. In this embodiment, the controller 30 erases the OSD display when a predetermined time elapses or when an operation input by the user is accepted.

Next, in the step S41, when the user again performs the shift operation input after the OSD display in the step S30, the controller 30 determines whether the target position (shift position) based on the shift operation input is located outside the "normal" range (first range). If the target position based on the shift operation input performed within a predetermined time after the OSD display in the step S30 is located within the first range (or if the shift operation input is not made within the predetermined time), the controller 30 ends this flow. On the other hand, if the target position is located outside the first range (if the target position is located in the second range), the flow proceeds to the step S51.

In the step S51, the controller 30 changes (updates) the shift range setting (or shiftable range) stored in the memory unit 90 from the "normal" range (only the first range) to the "expanded" range (both the first range and the second range), and ends this flow. In this embodiment, unlike the step S50 in FIG. 2, the setting change (update) of the memory unit 90 is temporary. Hence, when the shift position returns to the "normal" range (first range), this setting is automatically changed again to the "normal" range.

In this embodiment, when the target position by the shifting unit through the shift operation exceeds the shiftable range limit, the OSD display of the description regarding the shift range setting (shiftable range) is provided and when the shift operation is continuously performed, the shift range setting can be temporarily changed. Thereby, the shift range setting can be easily changed. While the user can unintendedly set the shiftable range to the "expanded" range (both the first range and the second range) by temporarily changing the shift range setting change, the likelihood of continuously using the image projection apparatus 100 can be reduced.

Each embodiment describes the shifting unit as the projection optical system 68 having an optical lens shift function, but the present invention is not limited to this embodiment. The shifting unit may be, for example, a digital shifting unit as the liquid crystal driver 50 having a shift function of electronically moving the image forming position on the liquid crystal display element 66. In each embodiment, the notifying unit (liquid crystal display element 66) notifies that the target position based on the user's operation input is located outside the first range by the OSD display, but the present invention is not limited to this embodiment. For example, the notifying unit may provide a sound notice or a vibration notice instead of the OSD display. In order to call user's attentions, the notifying unit in each embodiment may always give a notice (the OSD display indicating that the shift position is located in the second range) while the position where the projection image is projected is located in the second range.

Thus, the image projection apparatus 100 in each embodiment includes a shifting unit (the liquid crystal driver 50 and the projection optical system 68), a determining unit (the controller 30), and a notifying unit (the liquid crystal display element 66). The shifting unit shifts the position (on the projection surface) where the projection image is projected. The determining unit determines whether or not the target position (shift target position) shiftable by the shifting unit is located in a second range different from the first range that can be projected with a predetermined image quality. The notifying unit provides the user with a predetermined notice when the target position is located in the second range.

The image projection apparatus 100 may include a setting unit (controller 30) configured to set the range shiftable by the shifting unit to one of only the first range ("normal" range), or both the first range and the second range ("expanded" range). The image projection apparatus 100 may include an instructing unit (operation unit 70) with which the user designates the target position. Then, the determining unit determines whether the target position is located in the second range based on the output signal from the instructing unit.

When the notifying unit gives the predetermined notice and then the user instructs the target position in the second range via the instructing unit, the setting unit may set the range shiftable by the shifting unit to both the first range and the second range. When the target position moves from the second range to the first range, the setting unit may change the range shiftable by the shifting unit to only the first range. The notifying unit may give the predetermined notice by superimposing and displaying an OSD (OSD image) on the projection image. The predetermined notice may be an instruction display of an operation method for changing the setting by the setting unit (FIG. 5). The predetermined notice may be a display of an option regarding whether or not to change a setting by the setting unit (FIG. 3). The setting unit may change the range shiftable by the shifting unit to both the first range and the second range when the user selects the change of the setting in response to the predetermined notice.

The notifying unit may perform the predetermined notice through the sound or vibration. The notifying unit may always give the predetermined notice while the position at which the projection image is formed is located in the second range.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The image projection apparatus according to each embodiment can notify of the existence of a restriction and can easily perform an operation for releasing the restriction when there is a restriction on the shiftable range by the shift function. Therefore, according to each embodiment, it is possible to provide an image projection apparatus capable of notifying information on extension of the shift range, a control method of the image projection apparatus, and a storage medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-155221, filed on Aug. 22, 2018, which is hereby incorporated by reference herein in its entirety.

What is claimed is:

1. An image projection apparatus configured to project a projection image through a projection optical system, the image projection apparatus comprising:
   a shifting unit configured to shift a position where the projection image is projected by shifting the projection optical system within a shiftable range including (i) a first shiftable range in which an image quality of the projection image is at least a predetermined image quality and (ii) a second shiftable range in which the image quality of the projection image is inferior to the predetermined image quality of the projection image provided by the first shiftable range;
   an instructing unit configured to receive a user instruction that sets a target position shiftable by the shifting unit;
   a determining unit configured to determine whether the target position is located in the second shiftable range different from the first shiftable range;

a notifying unit configured to notify the user of a predetermined notice in a case where it is determined that the target position is located in the second shiftable range; and a setting unit configured to set a range shiftable by the shifting unit to either the first shiftable range only or to both the first shiftable range and the second shiftable range, wherein in a case where the target position is to be set in the second shiftable range after the notifying unit gives the predetermined notice, the setting unit is configured to set the range shiftable by the shifting unit to both the first shiftable range and the second shiftable range.

2. The image projection apparatus according to claim 1, wherein in a case where the target position moves from the second shiftable range to the first shiftable range, the setting unit is configured to change the range shiftable by the shifting unit to the first shiftable range.

3. The image projection apparatus according to claim 1, wherein the notifying unit is configured to give the predetermined notice by superimposing and displaying an OSD on the projection image.

4. The image projection apparatus according to claim 1, wherein the predetermined notice is an explanatory display of an operation method configured to change a setting by the setting unit.

5. The image projection apparatus according to claim 1, wherein the predetermined notice includes a display of an option regarding whether to change a setting by the setting unit.

6. The image projection apparatus according to claim 5, wherein the setting unit is configured to change the range shiftable by the shifting unit to both the first shiftable range and the second shiftable range in a case where the user selects a change of the setting according to the predetermined notice.

7. The image projection apparatus according to claim 1, wherein the notifying unit is configured to perform the predetermined notice by a sound or a vibration.

8. The image projection apparatus according to claim 1, wherein the notifying unit is configured to always give the predetermined notice while the position where the projection image is projected is located in the second shiftable range.

9. The image projection apparatus according to claim 1, wherein the shifting unit is configured to move part of lenses in the projection optical system in a direction perpendicular to an optical axis.

10. The image projection apparatus according to claim 1, wherein the shifting unit is configured to move the projection optical system in a direction perpendicular to an optical axis.

11. The image projection apparatus according to claim 1, wherein the shifting unit is configured to move an image forming position of the light modulation element.

12. The image projection apparatus according to claim 1, wherein the second shiftable range is located outside the first shiftable range.

13. The image projection apparatus according to claim 1, wherein the second shiftable range is a range where an evaluation value related to the projection image obtained by evaluating at least one of chip, a peripheral light amount drop, a chromatic aberration, a distortion, or a curvature of field is inferior to the evaluation value related to the projection image in the first shiftable range.

14. A control method for an image projection apparatus configured to project a projection image through a projection optical system and including a shifting unit configured to shift a position where the projection image is projected by shifting the projection optical system within a shiftable range including (i) a first shiftable range in which an image quality of the projection image is at least a predetermined image quality and (ii) a second shiftable range in which the image quality of the projection image is inferior to the predetermined image quality of the projection image provided by the first shiftable range, the control method comprising:

receiving a user instruction that sets a target position shiftable by the shifting unit;

determining whether the target position is located in the second shiftable range different from the first shiftable range;

sending a predetermined notice to the user in a case where it is determined that the target position is located in the second shiftable range; and setting a range shiftable by the shifting unit to either the first shiftable range only or to both the first shiftable range and the second shiftable range, wherein in a case where the target position is to be set in the second shiftable range after the predetermined notice is sent, the range shiftable by the shifting unit is set to both the first shiftable range and the second shiftable range.

15. A non-transitory computer-readable storage medium storing a program for causing a computer to execute a control method for an image projection apparatus configured to project a projection image through a projection optical system and comprising a shifting unit configured to shift a position where the projection image is projected by shifting the projection optical system within a shiftable range including (i) a first shiftable range in which an image quality of the projection image is at least a predetermined image quality and (ii) a second shiftable range in which the image quality of the projection image is inferior to the predetermined image quality of the projection image provided by the first shiftable range, the control method comprising:

receiving a user instruction that sets a target position shiftable by the shifting unit;

determining whether the target position is located in the second shiftable range different from the first shiftable range;

sending a predetermined notice to the user in a case where it is determined that the target position is located in the second shiftable range; and setting a range shiftable by the shifting unit to either the first shiftable range only or to both the first shiftable range and the second shiftable range, wherein in a case where the target position is to be set in the second shiftable range after the predetermined notice is sent, the range shiftable by the shifting unit is set to both the first shiftable range and the second shiftable range.

* * * * *